(12) United States Patent
Palinkas et al.

(10) Patent No.: US 8,529,814 B2
(45) Date of Patent: Sep. 10, 2013

(54) SUPPORTED HOLLOW FIBER MEMBRANE

(75) Inventors: Attila Palinkas, Budapest (HU);
Marcell Marschall, Agostyan (HU);
Robert Szabo, Agard (HU)

(73) Assignee: General Electric Company,
Schenectady, NY (US)

( * ) Notice: Subject to any disclaimer, the term of this patent is extended or adjusted under 35 U.S.C. 154(b) by 0 days.

(21) Appl. No.: 12/968,402

(22) Filed: Dec. 15, 2010

(65) Prior Publication Data

US 2012/0156485 A1    Jun. 21, 2012

(51) Int. Cl.

| | |
|---|---|
| *B29C 47/00* | (2006.01) |
| *B29C 47/88* | (2006.01) |
| *B29C 47/12* | (2006.01) |
| *B01D 29/00* | (2006.01) |
| *B01D 33/21* | (2006.01) |

(52) U.S. Cl.
USPC ............. 264/177.14; 264/117.17; 264/178 R; 210/500.23; 210/490

(58) Field of Classification Search
USPC .......... 210/500.23, 490, 500.27; 264/177.14, 264/159, 177.17, 178 R; 428/36.1, 36.3; 427/177.14, 209.5, 178 R; 96/4–10
See application file for complete search history.

(56) References Cited

U.S. PATENT DOCUMENTS

| | | | |
|---|---|---|---|
| 2,936,482 A | 5/1960 | Kilian | |
| 3,494,121 A | 2/1970 | Bohrer | |
| 3,567,666 A | 3/1971 | Berger | |
| 3,615,024 A | 10/1971 | Michaels | |
| 3,676,193 A | 7/1972 | Cooper, IV et al. | |
| 3,745,142 A | 7/1973 | Mahlman | |
| 3,849,241 A | 11/1974 | Butin et al. | |
| 3,948,781 A | 4/1976 | Brun et al. | |
| 3,984,328 A | 10/1976 | Brun et al. | |
| 4,020,230 A | 4/1977 | Mahoney et al. | |

(Continued)

FOREIGN PATENT DOCUMENTS

| | | |
|---|---|---|
| CA | 986422 | 3/1976 |
| CA | 2288316 | 5/2000 |

(Continued)

OTHER PUBLICATIONS

Caplan et al., Formation of microporous Teflon PFA membranes via thermally induced phase separation, Journal of Membrane Science, 130 (1997) p. 219-237.

(Continued)

*Primary Examiner* — Ana Fortuna
(74) *Attorney, Agent, or Firm* — Scott Pundsack; Borden Ladner Gervais LLP

(57) ABSTRACT

A hollow fiber membrane is made by covering a tubular supporting structure with a membrane dope and converting the membrane dope into a solid porous membrane wall. Optionally, a textile reinforcing structure in the form of a circular knit may be added around the supporting structure before it is covered in dope. The reinforcing structure thereby becomes embedded in the membrane wall. The supporting structure may be soluble in a non-solvent of the membrane wall, for example water, and may be removed from the membrane. Alternatively, the supporting structure may be porous. A porous supporting structure may be made by a non-woven textile process, a sintering process within an extrusion machine, or by extruding a polymer mixed with a second component. The second component may be a soluble solid or liquid, a super-critical gas, or a second polymer that does not react with the first polymer.

16 Claims, 2 Drawing Sheets

(56) References Cited

U.S. PATENT DOCUMENTS

| | | | |
|---|---|---|---|
| 4,061,821 A * | 12/1977 | Hayano et al. | 428/37 |
| 4,115,492 A | 9/1978 | Mahoney et al. | |
| 4,247,498 A | 1/1981 | Castro | |
| 4,253,936 A | 3/1981 | Leysen et al. | |
| 4,299,083 A | 11/1981 | Igel et al. | |
| 4,335,193 A | 6/1982 | Doi et al. | |
| 4,340,480 A | 7/1982 | Pall et al. | |
| 4,384,047 A | 5/1983 | Benzinger et al. | |
| 4,399,035 A | 8/1983 | Nohmi et al. | |
| 4,405,688 A | 9/1983 | Lowery et al. | |
| 4,406,850 A | 9/1983 | Hills | |
| 4,541,981 A | 9/1985 | Lowery et al. | |
| 4,664,681 A | 5/1987 | Anazawa et al. | |
| 4,666,607 A | 5/1987 | Josefiak et al. | |
| 4,702,836 A | 10/1987 | Mutoh et al. | |
| 4,707,265 A | 11/1987 | Barnes, Jr. et al. | |
| 4,741,829 A | 5/1988 | Takemura et al. | |
| 4,764,320 A | 8/1988 | Chau et al. | |
| 4,919,856 A | 4/1990 | Anazawa et al. | |
| 4,957,943 A | 9/1990 | McAllister et al. | |
| 5,011,588 A | 4/1991 | Rao et al. | |
| 5,013,339 A | 5/1991 | Mahoney et al. | |
| 5,022,990 A | 6/1991 | Doi et al. | |
| 5,032,282 A * | 7/1991 | Linder et al. | 210/651 |
| 5,034,129 A * | 7/1991 | Ten Hove | 210/490 |
| 5,066,401 A | 11/1991 | Muller et al. | |
| 5,139,529 A | 8/1992 | Seita et al. | |
| 5,143,312 A | 9/1992 | Baurmeister | |
| 5,151,191 A | 9/1992 | Sunaoka et al. | |
| 5,171,493 A | 12/1992 | Aptel et al. | |
| 5,209,852 A | 5/1993 | Sunaoka et al. | |
| 5,232,597 A | 8/1993 | Eguchi | |
| 5,232,642 A | 8/1993 | Kamo et al. | |
| 5,238,562 A | 8/1993 | Rogut | |
| 5,240,610 A | 8/1993 | Tani et al. | |
| 5,271,883 A | 12/1993 | Timmons et al. | |
| 5,284,583 A | 2/1994 | Rogut | |
| 5,294,338 A | 3/1994 | Kamo et al. | |
| 5,303,550 A | 4/1994 | Setzer | |
| 5,328,610 A | 7/1994 | Rogut | |
| 5,332,498 A | 7/1994 | Rogut | |
| 5,336,298 A | 8/1994 | Quinn et al. | |
| 5,375,453 A | 12/1994 | Rudd et al. | |
| 5,376,273 A | 12/1994 | Pacheco et al. | |
| 5,385,777 A | 1/1995 | Higuchi et al. | |
| 5,392,588 A | 2/1995 | Morrison | |
| 5,435,955 A | 7/1995 | Kamei et al. | |
| 5,470,659 A | 11/1995 | Baumgart et al. | |
| 5,472,607 A * | 12/1995 | Mailvaganam et al. | 210/490 |
| 5,474,680 A | 12/1995 | Eguchi | |
| 5,489,406 A | 2/1996 | Beck et al. | |
| 5,497,608 A | 3/1996 | Matsumoto et al. | |
| 5,547,756 A | 8/1996 | Kamo et al. | |
| 5,637,385 A | 6/1997 | Mizuki et al. | |
| 5,656,167 A | 8/1997 | Martz | |
| 5,709,735 A | 1/1998 | Midkiff et al. | |
| 5,716,689 A | 2/1998 | Rogut | |
| 5,753,351 A | 5/1998 | Yoshida et al. | |
| 5,782,959 A | 7/1998 | Yang et al. | |
| 5,783,608 A | 7/1998 | Sugo et al. | |
| 5,804,128 A | 9/1998 | Ogata et al. | |
| 5,882,461 A | 3/1999 | Rogut | |
| 5,888,605 A | 3/1999 | Hachisuka et al. | |
| 5,914,039 A * | 6/1999 | Mahendran et al. | 210/500.25 |
| 5,972,501 A | 10/1999 | Ohmory et al. | |
| 6,015,495 A | 1/2000 | Koo et al. | |
| 6,024,872 A | 2/2000 | Mahendran et al. | |
| 6,048,641 A | 4/2000 | Ohmory et al. | |
| 6,077,376 A | 6/2000 | Katraro et al. | |
| 6,083,393 A | 7/2000 | Wu et al. | |
| 6,090,731 A | 7/2000 | Pike et al. | |
| 6,114,017 A | 9/2000 | Fabbricante et al. | |
| 6,127,433 A | 10/2000 | Sugo et al. | |
| 6,183,640 B1 | 2/2001 | Wang | |
| 6,245,239 B1 | 6/2001 | Cote et al. | |
| 6,264,044 B1 | 7/2001 | Meyering et al. | |
| 6,273,271 B1 | 8/2001 | Moya | |
| 6,280,791 B1 | 8/2001 | Meyering et al. | |
| 6,354,443 B1 | 3/2002 | Moya | |
| 6,354,444 B1 | 3/2002 | Mahendran et al. | |
| 6,454,943 B1 | 9/2002 | Koenhen | |
| 6,465,094 B1 | 10/2002 | Dugan | |
| 6,495,663 B1 | 12/2002 | Rothbard et al. | |
| 6,559,192 B2 | 5/2003 | Maccone et al. | |
| 6,635,204 B2 | 10/2003 | Tanaka et al. | |
| 6,746,627 B2 | 6/2004 | Niu et al. | |
| 6,792,744 B2 | 9/2004 | Feuerlohn et al. | |
| 6,802,971 B2 | 10/2004 | Gorsuch et al. | |
| 6,890,435 B2 | 5/2005 | Ji et al. | |
| 7,081,273 B2 | 7/2006 | Ji | |
| 7,165,682 B1 * | 1/2007 | Ji | 210/490 |
| 7,172,075 B1 | 2/2007 | Ji | |
| 7,185,597 B1 * | 3/2007 | Phillips et al. | 112/475.04 |
| 7,247,238 B2 | 7/2007 | Mullette et al. | |
| 7,267,872 B2 * | 9/2007 | Lee et al. | 428/376 |
| 7,306,105 B2 * | 12/2007 | Shinada et al. | 210/483 |
| 7,413,804 B2 | 8/2008 | Lee et al. | |
| 7,563,376 B2 | 7/2009 | Oishi | |
| 7,861,869 B2 * | 1/2011 | Beckers et al. | 210/490 |
| 2002/0046970 A1 | 4/2002 | Murase et al. | |
| 2002/0090690 A1 | 7/2002 | Eddleman et al. | |
| 2002/0155289 A1 | 10/2002 | Cistone et al. | |
| 2003/0094409 A1 | 5/2003 | Minegishi et al. | |
| 2003/0107150 A1 | 6/2003 | Hamanaka et al. | |
| 2003/0192826 A1 | 10/2003 | Wang et al. | |
| 2003/0197308 A1 | 10/2003 | Montoya | |
| 2004/0078903 A1 | 4/2004 | Bruning et al. | |
| 2004/0136894 A1 | 7/2004 | Yoshizawa et al. | |
| 2005/0205488 A1 | 9/2005 | Shinada et al. | |
| 2006/0175243 A1 | 8/2006 | Mahendran et al. | |
| 2007/0084794 A1 * | 4/2007 | Morikawa et al. | 210/650 |
| 2007/0262017 A1 | 11/2007 | Shinada et al. | |
| 2008/0023125 A1 | 1/2008 | Arnold et al. | |
| 2008/0210623 A1 | 9/2008 | McMahon et al. | |
| 2008/0241451 A1 | 10/2008 | Beckers et al. | |
| 2008/0292823 A1 | 11/2008 | Lee et al. | |
| 2008/0305290 A1 | 12/2008 | Lee et al. | |
| 2009/0068428 A1 | 3/2009 | Shinoda et al. | |
| 2011/0114553 A1 * | 5/2011 | Teramachi et al. | 210/490 |
| 2012/0097604 A1 * | 4/2012 | Cote et al. | 210/500.23 |

FOREIGN PATENT DOCUMENTS

| | | |
|---|---|---|
| CA | 2474625 | 8/2003 |
| CA | 2478445 | 9/2003 |
| CA | 2478831 | 9/2003 |
| CA | 2630418 | 6/2007 |
| CH | 507012 | 5/1971 |
| DE | 4142417 | 6/1992 |
| DE | 10211051 | 10/2003 |
| EP | 0241995 | 10/1987 |
| EP | 0761292 A1 | 3/1997 |
| EP | 0819467 | 1/1998 |
| EP | 0998972 | 5/2000 |
| EP | 1193292 | 4/2002 |
| EP | 1236503 | 9/2002 |
| EP | 1658889 A1 | 5/2006 |
| EP | 0998972 B1 | 4/2007 |
| EP | 2301654 | 3/2011 |
| FR | 1511581 | 2/1968 |
| FR | 2616812 | 12/1988 |
| FR | 2336962 | 7/1997 |
| GB | 1374704 | 11/1974 |
| GB | 2041821 | 9/1980 |
| JP | 53-039982 | 9/1974 |
| JP | 52137026 | 11/1977 |
| JP | 53028084 | 3/1978 |
| JP | 55137209 | 10/1980 |
| JP | 57005914 | 1/1982 |
| JP | 57-028139 | 2/1982 |
| JP | 58-004810 | 1/1983 |
| JP | 58-049408 | 3/1983 |
| JP | 58-093734 | 6/1983 |
| JP | 59196706 | 11/1984 |
| JP | 60137402 | 7/1985 |

| | | |
|---|---|---|
| JP | 60139815 | 7/1985 |
| JP | 61-146811 | 7/1986 |
| JP | 62001404 | 1/1987 |
| JP | 62019206 | 1/1987 |
| JP | 62045318 | 2/1987 |
| JP | 62079806 | 4/1987 |
| JP | 62-133190 | 6/1987 |
| JP | 64-014315 | 1/1989 |
| JP | 2107318 | 4/1990 |
| JP | 2268816 | 11/1990 |
| JP | 04-265132 | 9/1992 |
| JP | 4265133 | 9/1992 |
| JP | 4293529 | 10/1992 |
| JP | 5301031 | 11/1993 |
| JP | 06-015152 | 1/1994 |
| JP | 06-246139 | 9/1994 |
| JP | 6246140 | 9/1994 |
| JP | 07-080263 | 3/1995 |
| JP | 07-116483 | 5/1995 |
| JP | 7157580 | 6/1995 |
| JP | 8165396 | 6/1996 |
| JP | 52082682 | 7/1997 |
| JP | 10-323546 | 12/1998 |
| JP | 11-319519 | 11/1999 |
| JP | 2000-093768 | 4/2000 |
| JP | 2000288365 | 10/2000 |
| JP | 2001-062258 | 3/2001 |
| JP | 2008-114180 | 5/2008 |
| NL | 1010458 C2 | 4/2000 |
| WO | WO 93/23153 | 11/1993 |
| WO | WO 99/01207 | 1/1999 |
| WO | 2009142279 | 11/1999 |
| WO | WO 00/78437 | 12/2000 |
| WO | WO 02/34373 | 5/2002 |
| WO | WO 03/059496 | 7/2003 |
| WO | WO 03/068374 | 8/2003 |
| WO | WO 03/076055 | 9/2003 |
| WO | WO 03/076056 | 9/2003 |
| WO | WO 03/097221 | 11/2003 |
| WO | WO 2004/009221 | 1/2004 |
| WO | WO 2004/089520 | 10/2004 |
| WO | WO 2005/002712 | 1/2005 |
| WO | WO 2006053406 | 5/2006 |
| WO | WO 2006063426 | 6/2006 |
| WO | WO 2007116072 | 10/2007 |
| WO | 2008066340 A1 | 6/2008 |
| WO | WO 2008066340 | 6/2008 |
| WO | WO 2010/081228 | 7/2010 |
| WO | 2010108285 A1 | 9/2010 |
| WO | WO 2010/108285 | 9/2010 |
| WO | WO 2010/148517 | 12/2010 |
| WO | 2012036935 | 3/2012 |

OTHER PUBLICATIONS

Choi et al., Fabrication and characterization of multi-walled carbon nanotubes/polymer blend membranes, Journal of Membrane Science 284 (2006) p. 406-415.
Choi et al., Modification of Performances of Various Memranes Using MWNTs as a Modifier, Macromol. Symp. 2007, 249-250, p. 610-617.
English language abstact of JP 11-319519 to Nitto Denko Corp, published Nov. 24, 1999.
English language abstract of JP 04-265132 to Ube Ind Ltd, published Sep. 21, 1992.
English language abstract of JP 04265133 to Ube Ind Ltd, published Sep. 21, 1992.
English language abstract of JP 04293529 to Ube Ind Ltd, published Oct. 19, 1992.
English language abstract of JP 06-015152 to Tokuyama Soda Co Ltd, published Jan. 25, 1994.
English language abstract of JP 06-246139 to Dainippon Ink & Chem Inc, published Sep. 6, 1994.
English language abstract of JP 06246140 to Dainippon Ink & Chem Inc, published Sep. 6, 1994.
English language abstract of JP 07-080263 to Mitsubishi Rayon Co Ltd, published Mar. 28, 1995.
English language abstract of JP 07-116483 to Dainippon Ink & Chem Inc, published May 9, 1995.
English language abstract of JP 07157580 to Kawamura Inst of Chem Res Dainippon Ink & Chem Inc, published Jun. 20, 1995.
English language abstract of JP 08165396 to Kurabe Ind Co Ltd, published Jun. 25, 1996.
English language abstract of JP 10-323546 to Nitto Denko Corp, published Dec. 8, 1998.
English language abstract of JP 11-319519 to Nitto Denko Corp published Nov. 24, 1999.
English language abstract of JP 2000-093768 to Nok Corp, published Apr. 4, 2000.
English language abstract of JP 2000288365 to Torary Ind Inc, published Oct. 17, 2000.
English language abstract of JP 2001-062258, to Mitsubishi Rayon Co. Ltd, published Mar. 2001.
English language abstract of JP 2008114180 to Mitsubishi Rayon Co Ltd, published May 22, 2008.
English language abstract of JP 2107318 to Daicel Chem, published Apr. 19, 1990.
English language abstract of JP 2268816 to Mitsubishi Rayon Co, published Nov. 2, 1990.
Ramaswamy et al., Fabication of poly (ECTFE) membranes via thermally induced phase separation, Journal of Membrane Science, 210 (2002) p. 175-180.
English language abstract of JP 52082682 to Asahi Chemical Ind, published Jul. 11, 1997.
English language abstract of JP 52137026 to Toyobo Co Ltd, published Nov. 16, 1977.
English language abstract of JP 5301031 to Daicel Chem, published Nov. 16, 1993.
English language abstract of JP 53028084 to Nitto Electric Ind Co, published Mar. 15, 1978.
English language abstract of JP 53-039982 to Kunyu, published Sep. 3, 1974.
English language abstract of JP 55137209 to Mitsubishi Rayon Co Ltd, published Oct. 25, 1980.
English language abstract of JP 57005914 to Mitsubishi Rayon Co Ltd, published Jan. 12, 1982.
English language abstract of JP 57-028139 to Asahi Chem Ind Co Ltd, published Feb. 15, 1982.
English language abstract of JP 58-004810 to Toyobo Co Ltd, published Jan. 12, 1983.
English language abstract of JP 58-049408 to Nitto Electric Ind Co Ltd, published Mar. 23, 1983.
English language abstract of JP 58-093734 to Asahi Kasei Kogyo KK, published Jun. 3, 1983.
English language abstract of JP 59196706 to Dainippon Ink & Chem Inc 'Kawamura Inst of Chem Res, published Nov. 8, 1984.
English language abstract of JP 60137402 to Mitsubishi Rayon Co Ltd, published Jul. 22, 1985.
English language abstract of JP 60139815 to Mitsubishi Rayon Co Ltd, published Jul. 24, 1985.
English language abstract of JP 61-146811 to Ube Ind Ltd, published Jul. 4, 1986.
English language abstract of JP 62001404 to Mitsubishi Rayon Co, published Jan. 7, 1987.
English language abstract of JP 62019206 to Dainippon Ink & Chem Inc, published Jan. 28, 1987.
English language abstract of JP 62045318 to Dainippon Ink & Chem Inc, published Feb. 27, 1987.
English language abstract of JP 62079806 to Ube Ind Ltd, published Apr. 13, 1987.
English language abstract of JP 62-133190 to Toagosei Chem Ind Co Ltd, published Jun. 16, 1987.
English language abstract of JP 64-014315 to Mitsubishi Rayon Co Ltd, published Jan. 18, 1989.
PCT Search Report dated Jun. 14, 2010 issued in connection with PCT Application No. PCT/CA2010/000469 which was filed on Mar. 26, 2010.
Lin et al., Microporous PVDF membrane formation by immersion precipitation from water/TEP/PVDF system, Desalination, 145 (2002) p. 25-29.

Lloyd et al., Microporous membrane formation via thermally-induced phase separation. II. Liquid-liquid phase separation, Journal of Membrane Science, 64 (1991) p. 1-11.

Lloyd, Douglas R., Microporous membrane formation via thermally induced phase separation. I. Solid-liquid phase separation, Journal of Membrane Science, 52 (1990) p. 239-261.

Search Report and Written Opinion from corresponding PCT Application No. PCT/US2011/063332 dated Jul. 31, 2012.

Jie Liu, Pingli Li et al. Preparation of PET threads reinforced PVDF hollow fiber membrane, Desalination, vol. 249, Issue 2, Dec. 15, 2009, pp. 453-457.

Search Report and Written Opinion from PCT/US2011/050479 dated Nov. 25, 2011.

* cited by examiner

SUPPORTED HOLLOW FIBER MEMBRANE

FIELD

This specification relates to hollow fiber membranes, to methods of making hollow fiber membranes, and to supporting structures for hollow fiber membranes.

BACKGROUND

The following discussion is not an admission that anything described below is common general knowledge or citable as prior art.

U.S. Pat. No. 5,472,607 describes a hollow fiber polymeric membrane supported by a braided textile tube. The braided tube is sufficiently dense and tightly braided that it is round stable before being coated with a membrane dope. The membrane polymer is located primarily on the outside of the braid. This type of structure has been used very successfully in the ZeeWeed™ 500 series membrane products currently sold by GE Water and Process Technologies. In particular, this type of supported membrane has proven to be extremely durable in use.

INTRODUCTION

The following paragraphs are intended to introduce the reader to the detailed description to follow and not to limit or define any claimed invention.

The inventors have observed that the number of filaments required to make a round stable braided support tends to result in braids that have an over-abundance of tensile strength. Braiding a round stable support is also a slow process, typically done at a speed of about 20-30 meters per hour. In comparison, the dope coating process may be done at speeds up to 20-40 meters per minute and so the braid must be wound onto a spool as it is made, and then taken off again during the coating process. Reducing the number of filaments in a braided support could reduce the cost of the membrane while still providing adequate tensile strength. However, with fewer filaments the braided support might not be round stable and might not provide enough support for the membrane dope during coating. Further, even if fewer filaments were used in the braid, the braiding speed would still be much less than the coating speed and the braiding and coating operations still could not be combined in the same production line.

Various methods of making hollow fiber membranes are described herein in which a membrane dope is extruded onto a tubular supporting structure, alternatively called a support or tubular support. In a first set of membranes, the tubular support is porous and remains as a part of the finished membrane. The porous supporting structure may be made, for example, by a non-woven textile process, a sintering process using an extruder, or by extruding a polymer mixed with a second component. The second component may be a soluble solid or liquid, a super-critical gas, or a second polymer that does not react with the first polymer. The supporting structure supports the membrane dope until the dope is solidified into a membrane wall. Depending on the type and material of the tubular support, the resulting composite structure, comprising the supporting structure and the membrane wall, may have more tensile strength than a membrane wall of the same thickness made with the dope alone.

In a second set of membranes, the tubular support is surrounded by a textile reinforcement formed over a tubular support. For example, the textile reinforcement may be knitted around the tubular support. In the second set of membranes, the tubular support may be dissolved out of the finished membrane after the dope has formed a membrane wall, leaving the textile reinforcement embedded in the membrane wall. Alternatively, a porous support as in the first set of membranes may be surrounded by a textile reinforcement and remain in the finished membrane. The tubular support supports the membrane dope until the dope is solidified into a membrane wall. The textile reinforcement increases the tensile strength of the membrane, relative to a membrane wall of the same thickness made with the dope alone. The tubular support, if retained, may also contribute to an increase in textile strength. Optionally, the textile reinforcement may be knitted around the tubular support at the same speed as, and in line with, a dope coating process.

FIGURES

DETAILED DESCRIPTION

Figure 1:
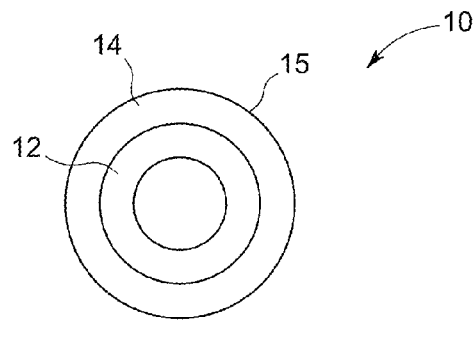
FIG. 1 is a schematic cross section of a first hollow fiber membrane.
Figure 2:
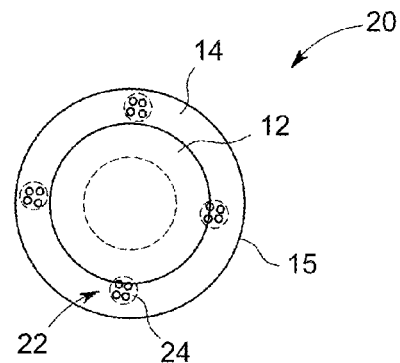
FIG. 2 is a schematic cross section of a second hollow fiber membrane.

Referring to FIGS. 1 and 2, a hollow fiber membrane 10 is made by forming a membrane wall 14 having an outer separation layer 15 over a tubular support 12. The tubular support 12 may be pre-made and stored on a spool until it will be used to manufacture the hollow fiber membrane 10. To make the hollow fiber membrane 10, the tubular support 12 is pulled through the centre of a coating head 16 while a membrane dope 18 is pumped through a die 19 onto the tubular support 12. The tubular support 12 passes through a central bore 17 of the coating head 16. The central bore 17 allows the tubular support to pass through the die 19 and also centers the tubular support 12 relative to the die 19 so that the dope 18 is applied evenly around the outside of the tubular support 12. The cylindrical surface of the support 12 allows the dope coating thickness, dope viscosity and other parameters to be chosen without being restricted to values that could be used in creating a membrane with the dope alone. After exiting from the coating head 16, the tubular support 12 and dope 18 pass into a quenching bath wherein the dope 18 is converted into a porous solid membrane wall 14. The formation of the membrane wall 14 may be by way of a thermally induced phase separation (TIPS) or non-solvent induced phase separation (NIPS) process. The separation layer 15 may have a nominal pore size in the microfiltration range or smaller.

The tubular support 12 may be porous and may remain inside of the finished hollow fiber membrane 10 in use. The tubular support 12 may have a higher tensile strength than a membrane wall 14 of the same thickness. Accordingly, the composite membrane 10 may also have a higher tensile strength than a membrane of the same thickness made with the dope 18 alone. A suitable permanent porous tubular support 12 can be made by extruding a mixture comprising two primary components though an annular die. A first primary component is a thermoplastic extrusion grade polymer that will remain as the porous support 12. A second primary component is a compatible substance that is soluble in a non-solvent of the first primary component. For example, the first primary component may be a water insoluble polymer and the second primary component may be a water-soluble substance such as sugar, salt, PVA or glycerol. The first and second primary components are chosen such that they do not react with each other. Instead, the first and second primary components are mixed with smooth agitation prior to extrusion so as to produce a homogenous mixture, for example an emulsion, of small particles of the second primary component in the first primary component. The mixture is extruded through an annular die and, optionally, a further outside diameter calibration die. The first primary component of the extruded mixture solidifies to form the support 12. The tubular support 12 is placed in a bath of a solvent of the second primary component, for example water, so that the second primary component can be leached out in the bath. This leaching step may occur before or after the membrane wall 14 is formed over the support 12. The first primary component could be an inexpensive (relative to the membrane dope 18) polymer, such as polyethylene (PE), if the tubular support 12 is required primarily to support the membrane dope 18 during coating. However, if a membrane 10 of greater strength is desired, then the first primary component may be a stronger polymer such as polyester (polyethylene terephthalate, PET).

Alternatively, a tubular support 12 may be made by extruding a mixture of two different thermoplastic materials. The two materials are chosen such that they are not reactive with each other. The two materials are also incompatible in the sense that the second material does not mix or dissolve well in the first material and instead the second material forms clusters with low adherence to a matrix provided by the first material. For example, one known second material is polymethylpentene (PMP). The first material may be, for example, PE or PET depending on whether cost or strength is more important for the finished membrane 10. After the extruded tube has solidified, it is stretched to set the final outside diameter of the tubular support 12, and to create small cracks between the two materials. The cracks provide the tubular support 12 with the desired porosity. A similar tubular support 12 can be made by mixing the first material with a non solute that is not a polymer such as $CaCO_3$.

As further extrusion based alternatives, a commercially available filtration tube can be used for the support 12. A tubular support 12 with an open cell structure can also be extruded out of a polymer mixed with a super critical gas such as carbon dioxide. As the mixture comes out of the extrusion die, a reduction in pressure allows the super critical gas to escape leaving an open cell structure. An extruded solid tube can also be punched out mechanically, or with one or more pulsating laser beams, to form the support 12.

A tubular support 12 can also be made without extrusion. For example, a non-woven support can be made by directing electro-spun, melt blown or spray blown fiber segments onto a rotating mandrel. The mandrel is porous with its inner bore connected to a source of suction such that the semi-solidified fiber segments collect on the mandrel. The fiber segments fully solidify and bond to each other on the mandrel to form a non-woven tube. One end of the tube is continually pulled off of the mandrel to create the tubular support 12. Optionally, a non-woven structure may have sufficient density to increase the strength of the membrane 10. A support 12 may also be made by a continuous sintering process with an extrusion machine. In this process, semi molten polymer granules are pressed together in an extruder and sintered under pressure pushing them through the extrusion die in a manner similar to metallic sintering, but into a tubular shape. This tube is than used as a support 12. The sintering process does not produce a support 12 with as much strength as a non-woven support, but sintering and non-woven techniques may be performed in line with the coating process.

Referring to FIG. 2, a second hollow fiber membrane 20 has a membrane wall 14, a permanent or temporary tubular support 12, and a textile reinforcement 22. The textile reinforcement 22 is preferably embedded in the membrane wall 14. In the second membrane 20 shown, the textile reinforcement 22 is knitted from monofilament or multifilament yarns or threads. In general, knitting may be done faster than braiding and requires a less complicated machine. In the textile reinforcement 22 shown, the knit is also designed to produce a looser structure, relative to current braided membrane support structures, and so requires less material than a braided membrane support. The textile reinforcement 22 is not dense enough to support the dope 18 by itself and so the textile reinforcement 22 is used in combination with a tubular support 12. However, the textile reinforcement 22 increases the strength of the resulting membrane 10.

Figure 3:
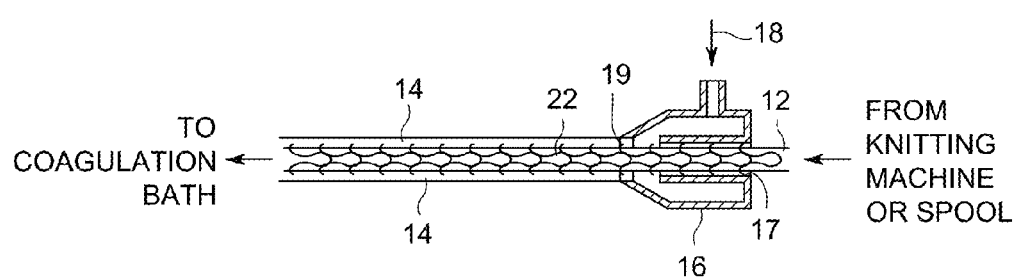
FIG. 3 is a cross section of a coating head.

The knitted reinforcement 22 is applied to the tubular support 12 by passing the support 12 through a knitting machine while knitting one or more mono or multi-filaments 24 in a tube around the support 12. The knitting may be done at the same speed as the dope coating process described in relation to FIG. 3 thus allowing the knitting to be done in line with the coating. In that case, the tubular support 12 may be drawn from a spool and pass directly, that is without being re-spooled, through the knitting machine and the coating head 16.

Alternatively, the textile reinforcement 22 may be provided in the form of one or more spiral wrappings made by passing a support 12 through a wrapping machine.

Further alternatively, a textile reinforcement 22 may be provided in the form of many short segments of filaments 24. For example, the textile reinforcement may be made by mixing micro fibers into the membrane dope 18. Micro fibers can also be applied to the outside surface of a semi-solidified membrane dope 18 by spraying chopped, electro-spun or melt blown fibers on the surface of the dope 18. The fibers are sprayed onto the membrane dope 18 as it leaves the coating head 16 or soon after such that the dope 18 may have started to solidify, but it is not yet solid.

Optionally, the one or more filaments 24 in the reinforcement 22 may be coated or bi-component filaments 24, or a yarn or other multi-filament form of filament 24 may have two or more types of component mono-filaments. Crossing or adjacent filaments 24 may be fixed to each other at points of contact. For example, filaments 24 may be fixed to each other by heat setting, ultraviolet light, welding, plasma, resins or other adhesives. The material of the filaments 24, the coating of coated filaments 24, one or more exposed material in bi-component filaments 24, or one or more mono-filaments in multi-filaments may be chosen to be suitable for a chosen fixation method if required. The flexibility of the textile reinforcement 22 may be adjusted by altering the density of the filaments 24, by deciding whether or not to fix filaments 24 together at points of contact or intersection, and by adjusting the density of points of contact or intersection between filaments 24.

The support 12 may remain inside the second membrane 20. In that case, the support 12 may be made by any of the methods described for the first membrane 10. Regardless of the method of making the permanent support 12, the reinforcement 22 is formed around the support 12, for example by being knit or cable wrapped around the support 12. Since the support 12 keeps the reinforcement 22 in a round shape and at a desired diameter, the density of the reinforcement 22 can be chosen based on the intended use of the membrane 20. For example, a membrane 20 intended for use in drinking water filtration may have a reinforcement 22 that is less dense than in a membrane 20 intended for use in waste water. After the reinforcement 22 is placed around the support 12, the combined structure is passed through the coating head 16 as described above in relation to FIG. 3.

If the tubular support 12 will not remain inside the finished membrane 20, then the support 12 is made from a material that is soluble in a non-solvent of the separating layer 14. For example, the support 12 may be water-soluble. The reinforcement 22 is applied around the support 12 as described above and the combined structure is passed through the coating head 16 as described in relation to FIG. 3. The support 12 provides a base keeping the inner surface shape of the reinforcement 22 in a tubular shape and keeping the combined structure centered in the coating head 16. This assists in creating a uniform coating of dope 18 and so a membrane wall 14 of uniform thickness.

After a solid membrane wall 14 has formed, the support 12 is washed out in the coagulation bath or a separate solvent. The reinforcement 22 is preferably loose enough that the dope 18 will have penetrated through the reinforcement 22 to the outer surface of the support 12. At least outer filaments 24, or segment of filaments 24, are encapsulated in the membrane wall 14. The reinforcement 22 can also be very thin such that the outside diameter of the membrane 20 can be 1 mm or less. The total amount of material used in the support 12 and the reinforcement 22 may be similar to or less than the amount of bore fluid required to make an unsupported membrane. Accordingly, a light duty supported membrane 22 can be made for a similar price as an unsupported membrane but with increased strength. The dissolved material from the support 12 can be recovered from the coagulation bath or other solvent.

With a knit reinforcement 22 over a tubular support 12, for example in the form of a water soluble tube, the applied tension during knitting and during the coating process helps ensure that the circular knit reinforcement 22 lies smoothly on the surface of the support 12. The wall thickness of the support 12 is chosen such that the support 12 is not fully dissolved until the membrane material in the dope 18 coagulates. Accordingly, although the filaments 24 may be fixed to each other before the dope 18 is applied to the support 12, this is not mandatory since the coagulated dope 18 is sufficient for maintaining the position of the filaments in the knit in the finished second membrane 20.

A knit reinforcement 22 is preferably made by circular warp knitting. Warp knits consist of multiple yarn systems (using mono or multi-filament yarns), which run longitudinally along the surface of the cylindrical knit. Each yarn system has a designated needle and the yarn guiding elements alternate between the loop forming needles. In comparison, a weft knit is formed from one or multiple yarn systems, which are interconnected by loops, formed by needles. In weft knitting the adjacent loops (stitches) run in a spiral shaped line around the length axis of the circular knit. A plurality of the loop (stitch) forming needles and the yarn guiding elements rotate with reference to each other. A weft knit provides a more nearly closed and cylindrical surface than a warp knit, but uses more filament 24 material and is less stable in length. While the weft material might be better if its primary purpose was to support the dope 18, in the present membrane 10 the dope is cast on to a tubular support 12 and the knit is intended to increase the strength of the membrane 10. A warp knit is more rigid or stable in length than a weft knit, and so the warp knit is preferred for use as the reinforcement 12.

Figure 4:
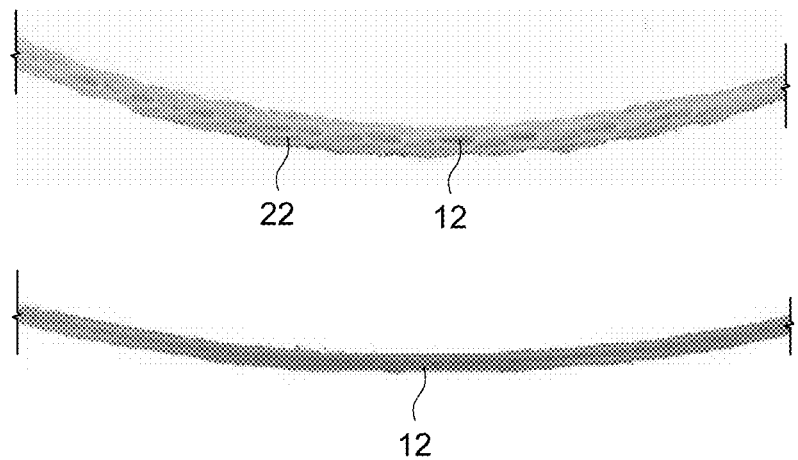
FIG. 4 is a photograph of a soluble tubular supporting structure below a soluble tubular supporting structure with a knitted textile reinforcement around it.
Figure 5:
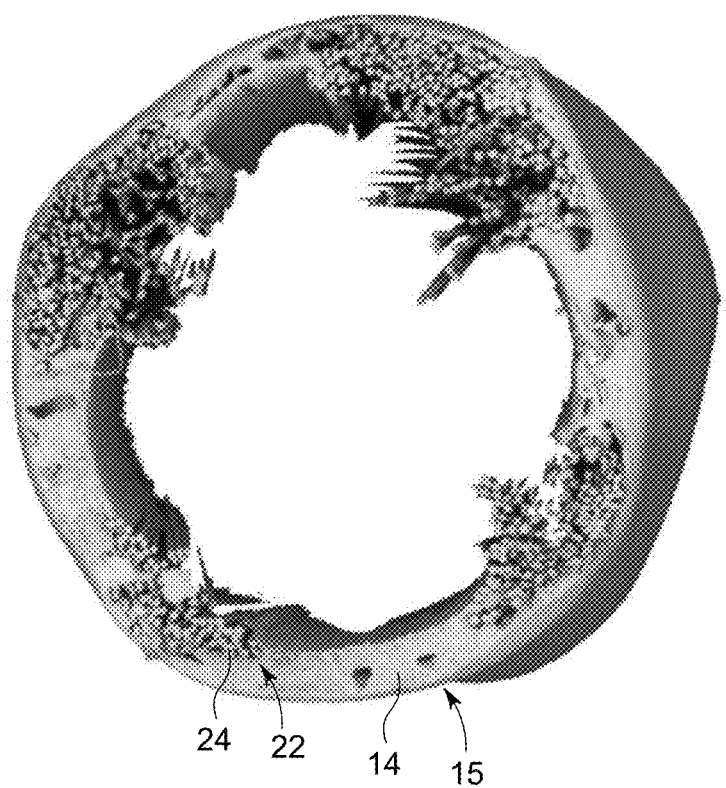
FIG. 5 is a cross section of a hollow fiber membrane made using a soluble supporting structure with a knitted textile reinforcement layer after the soluble tubular supporting structure has been washed away.

FIG. 4 shows, in the lower part of the figure, an example of a tubular support made by extruding PVAL. In the upper part of FIG. 4, fine polyester multifilament yarns (133 dtex f 32) where knit on a 4 needle warp knitting machine, by forming the loops on the adjacent needles, over a soluble tubular support 12. The stitch length was 2.5-3.5 mm (2.8-4 loops/cm). The combined structure was then coated with a PVDF based membrane dope 18. After the dope was formed into a solid separation layer 14, the support 12 was dissolved out. A cross section of the resulting membrane 20 is shown in FIG. 5.

The invention claimed is:

1. A method of making a hollow fiber membrane comprising the steps of,
 a) providing a tubular supporting structure;
 b) forming a textile reinforcing structure in the form of a circular knit around the supporting structure;
 c) covering the textile reinforcing structure with a membrane dope; and,
 d) converting the membrane dope into a solid porous membrane wall,
  wherein step b) comprises passing the supporting structure through a circular warp knitting machine wherein the tubular supporting structure is porous or the method comprises removing the tubular supporting structure.

2. The method of claim 1 further comprising a step of dissolving the tubular supporting structure after step d).

3. The method of claim 2 wherein the tubular supporting structure is water soluble.

4. The method of claim 1 wherein the textile reinforcing structure is formed around the supporting structure under tension.

5. The method of claim 1 wherein step c) comprises passing the supporting structure and reinforcing structure through the inlet of a coating head, wherein the inlet is centered within a membrane dope outlet.

6. The method of claim 1 wherein the circular warp knitting machine is in line with the coating head.

7. The method of claim 1 wherein the supporting structure is porous.

8. The method of claim 7 wherein step a) comprises extruding a mixture of a thermoplastic membrane polymer and a second material selected from the group consisting of a) a super-critical gas, b) a water soluble solid or liquid, and c) a polymer that is non-reactive with the membrane polymer.

9. The method of claim 7 wherein the supporting structure is a non-woven material.

10. The method of claim 7 wherein step a) comprises extruding semi-molten granules of a polymer.

11. A method of making a hollow fiber membrane comprising the steps of,
 a) providing a porous tubular supporting structure;
 b) covering the supporting structure with a membrane dope; and,
 c) converting the membrane dope into a solid porous membrane wall,
  wherein step a) comprises a step selected from the group consisting of
   (i) extruding a mixture of a thermoplastic membrane polymer and super-critical carbon dioxide gas;
   (ii) extruding a mixture of a thermoplastic membrane polymer and a water soluble solid or liquid;
   (iii) extruding a mixture of a thermoplastic membrane polymer and a second polymer that is non-reactive with the membrane polymer, followed by stretching the extrusion to create cracks between the two polymers; and, (iv) extruding semi-molten granules of a polymer under pressure through an annular die.

12. The method of claim 11 wherein step a) comprises extruding a mixture of a thermoplastic membrane polymer and super-critical carbon dioxide gas.

13. The method of claim 11 wherein step a) comprises extruding a mixture of a thermoplastic membrane polymer and a water soluble solid or liquid.

14. The method of claim 11 wherein step a) comprises extruding a mixture of a thermoplastic membrane polymer and a second polymer that is non-reactive with the membrane polymer, followed by stretching the extrusion to create cracks between the two polymers.

15. The method of claim 11 wherein step a) comprises extruding semi-molten granules of a polymer under pressure through an annular die.

16. The method of claim 11 further comprising a step of forming a textile reinforcing structure in the form of a circular knit around the supporting structure after step a) and before step b).

* * * * *